United States Patent
Shao et al.

(10) Patent No.: US 12,091,371 B2
(45) Date of Patent: Sep. 17, 2024

(54) ORGANIC FERTILIZER FOR CONTROLLING POLLUTION OR ACCUMULATION OF HEAVY METAL CADMIUM IN RICE AND PREPARATION METHOD AND APPLICATION METHOD THEREOF

(71) Applicant: CHINA NATIONAL RICE RESEARCH INSTITUTE, Zhejiang (CN)

(72) Inventors: Guosheng Shao, Zhejiang (CN); Qina Huang, Zhejiang (CN)

(73) Assignee: CHINA NATIONAL RICE RESEARCH INSTITUTE, Zhejiang (CN)

(*) Notice: Subject to any disclaimer, the term of this patent is extended or adjusted under 35 U.S.C. 154(b) by 960 days.

(21) Appl. No.: 17/051,780

(22) PCT Filed: Nov. 20, 2019

(86) PCT No.: PCT/CN2019/119695
§ 371 (c)(1),
(2) Date: Oct. 30, 2020

(87) PCT Pub. No.: WO2021/097706
PCT Pub. Date: May 27, 2021

(65) Prior Publication Data
US 2022/0220042 A1    Jul. 14, 2022

(30) Foreign Application Priority Data
Nov. 18, 2019 (CN) .......................... 201911129227.5

(51) Int. Cl.
C05D 9/02 (2006.01)
A01C 21/00 (2006.01)
C05F 3/00 (2006.01)
C05F 5/00 (2006.01)
C05G 1/00 (2006.01)
C05G 3/80 (2020.01)
A01G 22/22 (2018.01)

(52) U.S. Cl.
CPC .............. *C05G 3/80* (2020.02); *A01C 21/005* (2013.01); *C05D 9/02* (2013.01); *C05F 3/00* (2013.01); *C05F 5/002* (2013.01); *C05G 1/00* (2013.01); *A01G 22/22* (2018.02)

(58) Field of Classification Search
None
See application file for complete search history.

(56) References Cited

FOREIGN PATENT DOCUMENTS

| | | | |
|---|---|---|---|
| CN | 101133710 | 3/2008 | |
| CN | 101507400 | 8/2009 | |
| CN | 103012017 | 4/2013 | |
| CN | 103030450 | 4/2013 | |
| CN | 103086800 | 5/2013 | |
| CN | 103242850 | 8/2013 | |
| CN | 106883016 A * | 6/2017 | ............... C05G 3/00 |
| CN | 107200649 A * | 9/2017 | ............... C05G 3/00 |
| CN | 108243831 A * | 7/2018 | ............... C05G 3/80 |
| CN | 108640750 A * | 10/2018 | ............... C05G 3/00 |
| CN | 109438114 A * | 3/2019 | ............... C05F 17/00 |
| WO | 2014121426 | 8/2014 | |
| WO | 2016029731 | 3/2016 | |

OTHER PUBLICATIONS

"International Search Report (Form PCT/ISA/210)" of PCT/CN2019/119695, mailed on Aug. 18, 2020, pp. 1-5.
"Written Opinion of the International Searching Authority (Form PCT/ISA/237)" of PCT/CN2019/119695, mailed on Aug. 18, 2020, pp. 1-5.

* cited by examiner

*Primary Examiner* — Wayne A Langel
(74) *Attorney, Agent, or Firm* — JCIP GLOBAL INC.

(57) ABSTRACT

A organic fertilizer for controlling pollution or accumulation of heavy metal cadmium in rice and a preparation method and an application method thereof are related to the technical field of fertilizers. The fertilizer is, based on 100 kg of organic material with a water content of 15%, added with 0.05-5 kg of iron salt calculated as iron, and is also added with manganese salt, zinc salt and copper salt, wherein a mass ratio of the iron salt calculated as iron, the manganese salt calculated as manganese, the zinc salt calculated as zinc and the copper salt calculated as copper is 1:0.2-8:0.08-2:0.001-0.5.

12 Claims, No Drawings

ORGANIC FERTILIZER FOR CONTROLLING POLLUTION OR ACCUMULATION OF HEAVY METAL CADMIUM IN RICE AND PREPARATION METHOD AND APPLICATION METHOD THEREOF

CROSS-REFERENCE TO RELATED APPLICATION

This application is a 371 of international application of PCT application serial no. PCT/CN2019/119695, filed on Nov. 20, 2019, which claims the priority benefit of China application no. 201911129227.5, filed on Nov. 18, 2019. The entirety of each of the above mentioned patent applications is hereby incorporated by reference herein and made a part of this specification.

TECHNICAL FIELD

The present invention belongs to the technical field of fertilizers, and particularly relates to a novel organic fertilizer for controlling pollution or accumulation of heavy metal cadmium in rice and a preparation method and an application method thereof.

BACKGROUND

Heavy metals such as cadmium, lead and mercury are non-essential elements of plants, which have toxic effects on plant growth and are major heavy metal pollutants for crop growth and food safety. These toxic heavy metals accumulate excessively in food and then enter the food chain, seriously threatening human health. According to the general survey results of rice quality and safety in China in 2002 and 2003 by the Quality Supervision, Inspection and Testing Center of Rice and Products of the Ministry of Agriculture of China, one of the quality and safety problems of rice is that cadmium, lead and other heavy metals exceed the standard, and the over-standard rate exceeds 10%. Industrial wastewater, waste gases and residues, non-ferrous metal mining and sewage irrigation can easily lead to excessive content of toxic heavy metals in soil, which can easily lead to excessive absorption by plants, and are the main source of heavy metal accumulation in plants or crops. For this reason, all countries have set strict limits on the allowable content of heavy metals in soil and food (or grain). For example, the limit content for cadmium in cereals in China is 0.2 mg/kg, 0.2 mg/kg for lead and 0.02 mg/kg for mercury.

The cadmium, lead and mercury contained in or accumulated in plant food, including rice and wheat, etc., are mainly absorbed by the root system from the soil, and then transported through the transpiration stream to the overground parts, where they are finally accumulated at the harvest parts. Studies have shown that the content of cadmium, lead and mercury in soil, especially the available content (that is, it can be absorbed by the root system) is the key factor affecting the absorption of cadmium, lead and mercury by the root system. Therefore, the reduction and control of available cadmium, lead and mercury in soil by various agronomic measures has been a hot research topic in the world. For example, in acidic and slightly acidic soils, increasing the soil pH by applying lime could significantly reduce the availability of cadmium, lead, and mercury in the soil and ultimately reduce the root absorption of these heavy metals. However, lime application also has many side effects. For example, when lime is applied, the increase in soil pH will not only reduce the availability of these heavy metals, but also greatly reduce the contents of essential elements such as iron, manganese, and zinc, which are very likely to cause crop nutrient deficiency and poor growth. On the other hand, due to the great difference in pH value and pH buffering capacity of different regions and different soil types, it is difficult to accurately control the application amount of lime. For rice, by promoting the increase of soil reducibility through flooding, while by increasing the divalent iron and promoting the precipitation of cadmium, lead and mercury in the form of sulfide, on the one hand, the soil availability of these heavy metals is reduced, and on the other hand, the absorption capacity of the root system for these elements is reduced, which can significantly reduce the absorption and accumulation of toxic heavy metals in soil by the root system. However, for rice, long-term flooding is not conducive to the growth of rice, and it is likely to lead to increased arsenic absorption by crops. The incorporation, immobilization and adsorption of heavy metals, such as cadmium, lead, and mercury, by adding curing agents or sorbents to the soil has been an important research area both in the world. At present, the reported curing agents or adsorbents mainly include zeolite, diatomite, sepiolite, bentonite, limestone, even alkaline coal cinder, etc. However, no large-scale production application of soil heavy metal curing agent or adsorbent has been seen due to the fact that either the effect is unsatisfactory, or it is not environment-friendly, or the cost is too high, so it has no popularization and application value. Patent No. 200710070666.4 has disclosed the way that cadmium in soil can enter plants through the iron absorption and metabolism pathway of rice the root system, and invented the agronomic technical measure for controlling cadmium accumulation in rice by applying chelated ferrous fertilizer to the soil. Patent No. 200910097196.X has disclosed that cadmium in soil can enter plant through manganese absorption and metabolism pathway of rice the root system, and invented agronomic technical measure for controlling cadmium accumulation in rice by soil application and foliar spraying of chelated (sub) manganese fertilizer. The chelated ferrous fertilizer or the chelated manganese fertilizer applied by the two methods has high market price, relatively large dosage and high overall cost; At the same time, it has been found in actual application that the effects of the two methods on controlling cadmium in rice are greatly different between different types of soils, such as acidic soil and neutral (weakly acidic) soil, cohesive soil and sandy soil. The main reason is that trace elements such as iron, manganese, copper, and zinc are greatly lost on acidic soil. Although it will not cause poor growth of rice, the addition of a single chelated iron fertilizer or manganese fertilizer still cannot effectively control cadmium accumulation in rice. Moreover, it is likely to lose the effect as the irrigation water is lost, and even the phenomenon of increased cadmium absorption in rice may appear. However, due to serious water seepage in sandy soil, the applied chelated iron or manganese fertilizer is very likely to be lost with the field water seepage due to its extremely high activity, losing its effect. In recent years, a large number of studies found that cadmium in soil could be absorbed not only by the root system through the iron and manganese metabolic systems, but also by the copper and zinc metabolic systems. For example, the cloned iron, manganese, copper and zinc transporters include OsNRAMP1, OsNRAMP5, OsHMA2, OsHMA3, OsIRT1, OsIRT2, OsMTP9, and others, which can transport cadmium. Moreover, with the advancement of science, it has been further discovered that there is a dynamic balance of mutual regulation and restriction in the absorption and accumulation of iron, manganese, copper and zinc by crop (rice) the root systems, which also explains at the level of molecular biology that the single use of chelated iron or manganese fertilizer may break the dynamic balance among trace elements and promote the absorption of cadmium by the root systems through other pathways of trace elements. This reveals that controlling cadmium absorption and accumulation in rice is a complex process of trace element balance and a problem of how to maintain the availability of trace elements in soil. On the whole, the dynamic balance of high available iron, manganese, copper, and zinc must be maintained. In conclusion, there is still a lack of a broadly applicable method and technology to control cadmium accumulation in rice in the world.

SUMMARY

Aiming at the problems in the prior art, the present invention aims to design and provide a novel organic fertilizer for controlling the cadmium pollution or accumulation of heavy metal cadmium in rice, which is convenient to apply, low in price, and can effectively reduce heavy metal cadmium pollution, and a preparation and application method thereof.

The principle of the present invention is that the absorption of cadmium by plant the root system and the accumulation of cadmium in edible parts of plants are generally related to the available content of cadmium in soil, the absorption capacity of the root system for cadmium and the ability of cadmium in plants to migrate to edible parts. The content of available cadmium in soil is mainly controlled by adjusting pH and applying passivators. However, there is no related technology that is widely used and has no side effects in the world. Base on the physiological and molecular mechanisms of cadmium absorption by rice the root system and cadmium migration to edible parts, and combined with the agronomic practices in rice production and soil chemical behavior of trace elements, we reduced cadmium absorption by rice the root system and cadmium accumulation in plants (including rice) through competitive inhibition in absorption of cadmium and other elements by the root system and inhibition of cadmium absorption by the root system.

The specific principle is as follows:

1. The physiological and molecular mechanism of cadmium absorption by and transport in rice plants, namely the regulation principle of gene network related to cadmium accumulation and transport in rice: cadmium is a divalent transition element. A large number of studies have clarified that cadmium in soil is absorbed by the root system in the form of $Cd^{2+}$, mainly through divalent metal ion transporters in the metabolic systems of trace elements such as iron, manganese and zinc on the cell membrane of the root system of rice (similar to other crops). Up till now, more than ten transporters (or genes) with the function of transporting divalent metal ions with the transport capacity of $Cd^{2+}$ have been found, among which the more important ones are OsIRT1, OsIRT2, OsHMA2, OsHMA3, OsLCT1, OsNRAMP1, OsNRAMP5, OsMT9, etc. These transporters have a low transport selectivity for divalent metal ions, and can transport a variety of divalent metal ions, mainly $Cd^{2+}$, $Mn^{2+}$, $Fe^{2+}$, $Zn^{2+}$, $Cu^{2+}$, etc. For example, OsNRAMP1 is considered to be an iron absorption and metabolism system with the function of transporting divalent metal ions such as $Cd^{2+}$ and $Fe^{2+}$ (ferrous ions). OsNRAMP5 is generally considered to be a manganese absorption and metabolism system with a strong capability of transporting $Cd^{2+}$, $Mn^{2+}$, $Fe^{2+}$, etc. Another significant feature of these divalent metal ion transporters is that the expression of these transporter genes is regulated by environmental and plant-related trace element content (or homeostasis). For example, increasing the content of available iron ions ($Fe^{2+}$ or $Fe^{3+}$) in soil or improving the homeostasis of iron in plants can significantly reduce the expression of the whole iron absorption and metabolism system, including OsNRAMP1 protein gene and some other divalent metal ion transporter genes, such as OsIRT1 and OsIRT2. Increasing the content of available $Mn^{2+}$ in the soil can significantly reduce the expression of OsNRAMP5 protein gene. Increasing the content of available zinc in soil can significantly reduce the expression of OsZIP family protein genes with $Cd^{2+}$ transport function. The same is true for increasing the content of available copper. Therefore, significantly increasing the content of available iron, manganese, copper and zinc in soil can not only competitively inhibit the absorption and transportation of cadmium by related transporters, but also reduce the expression level of related transporter genes in the root system, further reducing the number of related transporters in the root system and the pathways for cadmium absorption and transportation. Ultimately, the accumulation of cadmium in plants can be greatly reduced.

As far as we know, the migration of cadmium in plants to edible parts is also carried out by divalent metal ion transporters. For example, OsNRAMP5 is expressed in the root system, stem and leaf, panicle neck and rice, playing a very important role in the transport of elements, including the migration of cadmium to rice. The accumulation of more iron, manganese, copper and zinc in the plants could also competitively inhibit transport function and reduce cadmium transport pathway.

2. How to improve the availability of trace elements (iron, manganese, copper, zinc, etc.) in soil, i.e. the principle of element balance in soil: Under normal circumstances, in the production process of crops, especially grain crops such as rice, wheat, and corn, little attention is paid to the content of trace elements in soil, especially the available content. Even if trace elements (trace fertilizers) are used, deep placement of base fertilizer or foliar spraying (for economic crops such as fruits and vegetables and the like) is used. When trace elements are used as base fertilizer, they are easily absorbed and fixed by soil particles to lose their availability. For example, some Japanese scientist have proposed that up to 0.3% of soil manganese can be use to control the accumulation of cadmium in rice. The reason is that most of the manganese is fixed by the soil and lose its availability. According to the characteristics of rice production, a combination of two methods can solve the above problems. (1) Mix trace elements with organic fertilize (or biological straw) in proper proportion to obtain granules (convenient for farmers to apply). In the organic matter decomposition process, a large amount of reducing substances and various organic acids will be produced, which will be combined with these elements and a higher concentration of free divalent state will be maintained for a long time, i.e., to maintain availability. (2) In the process of rice production, a large amount of water is needed. And the process can be roughly divided into the following stages: At the early growth stage of rice, the paddy field is basically flooded. When tillering is sufficient, drainage and drying in the field is started to control tillering, followed by re-irrigation (which is at the end of tillering or the beginning of booting) until rice heading and filling, and drainage at the later stage of maturity for later harvest. According to the characteristics of rice production, the granular organic fertilizer is used as additional fertilizer. The granular organic fertilizer is easy to rot on the soil surface and dissolves the trace fertilizer in the soil surface water, so that the concentration and the availability of the trace fertilizer are greatly improved. At the same time, the vast majority of rice roots are located within 20 cm of the topsoil. Especially after the field drying and water overlying, a large number of new roots in the soil surface are easy to absorb and use the trace fertilizer. As a whole, the availability of trace fertilizers is greatly improved and the absorption and utilization of trace fertilizers by the root system are significantly improved.

3. Proportioning principle of trace elements in organic fertilizers, i.e., the principle of nutrient balance or trace elements in rice plants: The elements absorbed and accumulated by any organism, including trace elements, are in a certain proportion and are mutually coordinated and restricted. It has been pointed out very clearly in studies that there is also a state of competition and restriction in the process of absorbing iron, manganese, copper and zinc by the plant the root system. For example, when the root system absorbs a large amount of iron, the absorption of manganese, copper and zinc is relatively reduced, and vice versa. From the perspective of absorption, there is competition between them and influence on each other's physiological and molecular mechanisms. From the plant as a whole, they are basically in a synergistic relationship. Through the determination of iron, manganese, copper, and zinc contents in 69 pieces of indica rice straws and 51 pieces of japonica rice straws harvested in the field, we have found that the content of iron, manganese, copper, and zinc in indica rice basically has the ratio of iron, manganese, zinc and copper being about 10:20-35:0.5-2:0.01-0.1, while that in japonica rice straw is about 10:25-40:0.5-2:0.01-0.1. The ratio of iron, manganese, zinc and copper in indica and japonica rice (polished rice) is generally 10:8-13:7-12:1-5.

4. The principle of organic fertilizer application, i.e., the principle of the dynamic process of cadmium absorption and accumulation in rice: Due to small biomass at early growth stage of rice and long-term flooding of rice field, the accumulation of cadmium in plants is relatively small; while the late growth stage with high biomass and long time is the key period for cadmium accumulation in rice plants. Therefore, it is inferred that the end tillering stage (initial booting stage) and the filling stage are the most critical stages. In addition, before grain filling of rice, the rice the root system is highly active and the absorbed nutrients, including trace elements, are mainly used for plant growth. The root system activity of rice is greatly reduced after grain filling (full heading stage), and it mainly absorbs water and mineral nutrients for photosynthesis. And part of the water and mineral nutrients are transported to rice. Some studies have suggested that more than 90% of the cadmium in rice comes from the transport of cadmium accumulated in rice plants before the heading stage. Some other studies have also pointed out that about 50% of cadmium in rice comes from the direct absorption of cadmium by the root system at the filling stage. Therefore, we believed that the ratio of iron, manganese, copper and zinc in the organic fertilizer applied before the full heading stage, including the seedling stage and the late tillering stage, is mainly to meet the needs of rice growth to regulate cadmium accumulation in rice plants. The ratio of iron, manganese, copper and zinc in organic fertilizer applied from the full heading stage should be appropriate to meet the requirement of rice element ratio, but the ratio of iron, manganese, copper and zinc in straw is not excluded.

5. The principle of adding organic acids and chelating agents, i.e., morphological mechanism of nutrient (trace element) absorption by the root system: Due to the different sources and types of organic fertilizers, the rot speed, degree and rot products of organic matter are different, appropriate amount of organic acid and chelating agent should be added to ensure the availability of trace elements. For example, organic fertilizer mainly based on commercially available organic fertilizer and low cellulose organic matter are easy to rot and produce a large amount of organic acid to combine and maintain the availability of trace fertilizer to a large extent; However, the rot rate of organic fertilizers mainly containing fiber straws and non-decomposed organic fertilizers is relatively slow, and the production of organic acids is relatively small. Thus the addition of organic acids and chelating agents can improve the availability of trace fertilizers to a large extent and make up for the lack of fiber straw organic fertilizers.

In order to solve the above-mentioned technical problems and utilize the above principles, the present invention adopts the following solutions:

The novel organic fertilizer for controlling pollution or accumulation of heavy metal cadmium in rice, characterized by, comprising an organic material with a water content of 15%, iron salt calculated as iron, manganese salt calculated as manganese, zinc salt calculated as zinc, and copper salt calculated as copper, wherein, based on 100 kg of the organic material with the water content of 15%, 0.05-5 kg of iron salt calculated as iron is added, and manganese salt, zinc salt and copper salt are added with a mass ratio of the iron salt calculated as iron, the manganese salt calculated as manganese, the zinc salt calculated as zinc, and the copper salt calculated as copper being 1:0.2-8:0.08-2:0.001-0.5.

The novel organic fertilizer for controlling pollution or accumulation of heavy metal cadmium in rice, characterized in that, the organic fertilizer is further added with organic acid and salt thereof and an organic chelating agent, a mass ratio of the iron salt, the manganese salt, the zinc salt, the copper salt, the organic acid and salt thereof, and the organic chelating agent being 1:0.2-8:0.08-2:0.001-0.5:0-1:0-1.

The novel organic fertilizer for controlling pollution or accumulation of heavy metal cadmium in rice, characterized in that, the mass ratio of the iron salt calculated as iron, the manganese salt calculated as manganese, the zinc salt calculated as zinc and the copper salt calculated as copper is 1:0.3-3:0.15-1:0.01-0.3.

The novel organic fertilizer for controlling pollution or accumulation of heavy metal cadmium in rice, wherein the organic material comprises one or more of a rapeseed cake, a soybean cake, a soybean meal, a rice straw, a barley and wheat straw, a sugar cane scrap, a sugar bagasse, a rape straw, a corn straw, a sorghum straw, a sawdust, a weed straw, an astragalus smicus straw, an alfalfa straw, a waste paper or water hyacinth;

or the organic material is a commercially available organic fertilizer with livestock manure as a main raw material.

The novel organic fertilizer for controlling pollution or accumulation of heavy metal cadmium in rice, characterized in that, the iron salt comprises one or more of ferrous sulfate, ferric sulfate, ferric chloride, ferrous chloride, ferric nitrate, ferric citrate, ferrous citrate, ferrous malate, ferrous malate, ferric oxalate, ferrous sulfide, ferric ethylenediaminetetraacetate or ferrous ethylenediaminetetraacetate.

The novel organic fertilizer for controlling pollution or accumulation of heavy metal cadmium in rice, characterized in that, the manganese salt comprises one or more of manganese sulfate, manganese chloride, manganese nitrate, manganese citrate, manganese malate, manganese oxalate, manganese sulfide or manganese ethylenediaminetetraacetate.

The novel organic fertilizer for controlling pollution or accumulation of heavy metal cadmium in rice, characterized in that, the zinc salt comprises one or more of zinc sulfate, zinc chloride, zinc nitrate, zinc citrate, zinc malate, zinc oxalate, zinc sulfide or zinc ethylenediaminetetraacetate.

The novel organic fertilizer for controlling pollution or accumulation of heavy metal cadmium in rice, characterized in that, the copper salt comprises one or more of copper sulfate, copper chloride, copper nitrate, copper citrate, copper malate, copper oxalate, cuprous sulfide or copper ethylenediaminetetraacetate.

The novel organic fertilizer for controlling pollution or accumulation of heavy metal cadmium in rice, characterized in that, the organic acid and salt thereof comprise one or more of citric acid, sodium citrate, potassium citrate, calcium citrate, magnesium citrate, malic acid, sodium malate, potassium malate, calcium malate, magnesium malate, oxalic acid, sodium oxalate, potassium oxalate, calcium oxalate or magnesium oxalate.

The novel organic fertilizer for controlling pollution or accumulation of heavy metal cadmium in rice, characterized in that, the organic chelating agent comprises one or more of ethylenediaminetetraacetic acid, ethylenediaminetetraacetic acid sodium, ethylenediaminetetraacetic acid potassium, ethylenediaminetetraacetic acid calcium or ethylenediaminetetraacetic acid magnesium.

The preparation method for the novel organic fertilizer for controlling pollution or accumulation of heavy metal cadmium in rice, characterized by, comprising the following steps:
1) uniformly mixing the organic material, iron salt, manganese salt, zinc salt, copper salt, organic acid and salt thereof, and organic chelating agent with the said mass and stirring into powder;
2) making the uniform powder obtained in step 1) into granules with a diameter of 0.3-1.2 cm by using an extruder or a granulator, the granules being the novel organic fertilizer for controlling the pollution or accumulation of heavy metal cadmium in rice.

The application method for the organic fertilizer for controlling pollution or accumulation of heavy metal cadmium in rice, characterized in that:
a. for early rice, carrying out topdressing when ploughing a field or within 10 days after transplanting seedlings, and broadcasting 0-500 kg of the organic fertilizer, preferably 5-50 kg, to each mu (0.16 acre) of the field as a base fertilizer; broadcasting 0-500 kg of the organic fertilizer, preferably 5-100 kg, to each mu of the field as an additional fertilizer at a booting stage; and broadcasting 0-500 kg of the organic fertilizer, preferably 5-50 kg, to each mu of the field at a filling stage;
b. for late rice, carrying out topdressing when ploughing the field or within 10 days after transplanting seedlings, and broadcasting 0-500 kg of the organic fertilizer, preferably 10-100 kg, to each mu of the field as the base fertilizer; broadcasting 0-500 kg of the organic fertilizer, preferably 10-100 kg, to each mu of the field as the additional fertilizer at the booting stage; and broadcasting 0-500 kg of the organic fertilizer, preferably 10-100 kg, to each mu of the field at the filling stage;
c. for single cropping rice, carrying out topdressing when ploughing the field or within 10 days after transplanting seedlings, and broadcasting 0-500 kg of the organic fertilizer, preferably 25-100 kg, to each mu of the field as the base fertilizer; broadcasting 0-500 kg of the organic fertilizer, preferably 25-100 kg, to each mu of the field as the additional fertilizer at the booting stage; broadcasting 0-500 kg of the organic fertilizer, preferably 25-100 kg, to each mu of the field at the early filling stage.

The present invention has the following advantageous effects:
(1) The organic fertilizer for controlling cadmium pollution or accumulation of rice is reasonable in design, simple to manufacture, has wide raw material source, and is simple in field application operation. Not only can it increase the soil organic matter, improve the soil physical and chemical environment, but more importantly, it can reduce the availability of heavy metal cadmium in the soil, prevent the absorption of cadmium by the rice the root system, improve the nutritional status of rice plants, and prevent the transport of cadmium in the root system to the overground part (straw), and prevent the migration of cadmium in rice straw to rice. In all cadmium absorption and transport ways, the transport of cadmium from soil to rice is blocked, thereby reducing the accumulation of cadmium in rice and the pollution of heavy metal cadmium. In addition, the organic formula fertilizer provided by the present invention has no adverse effects on soil, paddy and rice, and can even significantly improve rice varieties (significantly increase the content of trace elements such as iron, manganese, copper, and zinc in rice) and rice yield.
(2) The organic fertilizer provided by the present invention is developed based on the chemical process of heavy metal cadmium in paddy soils, the absorption process of rice roots and the cadmium transport process of plants, features convenient application, low usage amount, low price and low use cost, and is generally applicable to some farmland in China polluted by cadmium with severe, moderate and mild degree, and has wide adaptability.

BRIEF DESCRIPTION

The specific Embodiments of the present invention are further described below to make the technical solution of the present invention easier to understand and master.

Embodiment 1: A Novel Organic Fertilizer for Controlling Pollution or Accumulation of Heavy Metal Cadmium in Rice Based on 1,000 kg of commercially available organic fertilizer with a water content of 15% (cow dung is used as a main raw material, nitrogen, phosphorus and potassium are all about 5%, and cadmium content is lower than 0.8 mg/kg), 30 kg of ferrous sulfate calculated as iron, 90 kg of manganese sulfate calculated as manganese, 5 kg of zinc sulfate calculated as zinc, and 0.5 kg of copper sulfate calculated as copper are added.

The organic fertilizer is prepared according to the following steps:
1) uniformly mixing the organic material, iron salt, manganese salt, zinc salt, copper salt, organic acid and salt thereof, and organic chelating agent with the said mass and stirring into powder;
2) making the uniform powder obtained in step 1) into granules with a diameter of 0.3-1.2 cm by using an extruder or a granulator, the granules being the novel organic fertilizer for controlling the pollution or accumulation of heavy metal cadmium in rice.

Specific Experiment 1: Experimental Study on the Control of Novel Organic Fertilizer on Cadmium Accumulation in Rice An experiment of cadmium pollution control of early rice was carried out using the organic fertilizer prepared in Embodiment 1 in Fuyang, Hangzhou, in 2016. The total cadmium content in the paddy field is 0.6 mg/kg, the soil pH is about 6.0, and the soil is clay. A plot contrast experiment was made for Zhongjiazao 17 and Fupin 36, with the plot area of 20 square meters. They were sowed on March 30 and transplanted on April 26. The fertilizer treatments were set with a blank control, a commercially available organic fertilizer control treatment, a treatment of organic fertilizer prepared according to Embodiment 1 and a equivalent trace element treatment, which were repeated three times. For specific treatment, the commercially available organic fertilizer control treatment is: commercially available organic fertilizer was applied separately at seedling stage (10 days after transplantation), booting stage and early filling stage (as a control) at 3 kg per plot and growth period; The treatment of organic fertilizer prepared according to Embodiment 1 is: the organic fertilizer prepared according to Embodiment 1 was applied separately at seedling stage (10 days after transplantation), booting stage and early filling stage (as a control) at 3 kg per plot and growth period. Meanwhile, after each fertilization, the field was kept flooded at 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 1

| | | | | Compared with commercially available |
|---|---|---|---|---|
| | | | Relative CK brown rice | organic fertilizer Cadmium |
| | | mean | Cadmium | reduction in |
| Treatment | | (mg/kg) | reduction | brown rice |
| Zhongjiazao 17 | CK | 0.361 ± 0.027 | 65.10% | 67.19% |
| | Equal trace element treatment | 0.337 ± 0.030 | | |
| | Commercial organic fertilizer treatment | 0.384 ± 0.019 | | |
| | Embodiment 1 Organic fertilizer treatment | 0.126 ± 0.024 | | |
| Fupin 36 | CK | 0.422 ± 0.016 | 54.98% | 53.55% |
| | Equal trace element treatment | 0.394 ± 0.040 | | |
| | Commercial organic fertilizer treatment | 0.409 ± 0.046 | | |
| | Embodiment 1 Organic fertilizer treatment | 0.190 ± 0.021 | | |

The results showed that compared with the blank control, the effects of commercially available organic fertilizer treatment on cadmium content in brown rice of the two rice varieties were different, but there was no significant difference, and both of them exceeded the national standard of 0.2 mg/kg. Compared with the treatments of blank control and commercially available organic fertilizer, the treatment of organic fertilizer of Embodiment 1 significantly reduced cadmium, and the cadmium content of brown rice of the two varieties was less than 0.2 mg/kg. Besides, the results directly showed that the decrease of cadmium content was due to the addition of ingredients in organic fertilizer. However, when the same amount of trace elements were applied, the cadmium content of two rice varieties decreased, but it was not significant, which was probably because iron, manganese, copper and zinc were applied to the field in a pure inorganic state, and were easily fixed by the soil and lost their activity.

In the Embodiment, the ferric salt comprises one or more of ferrous sulfate, ferric sulfate, ferric chloride, ferrous chloride, ferric nitrate, ferric citrate, ferrous citrate, ferric malate, ferrous malate, ferric oxalate, ferrous oxalate, ferrous sulfide, ferric edta or ferrous edta; The manganese salt comprises one or more of manganese sulfate, manganese chloride, manganese nitrate, manganese citrate, manganese malate, manganese oxalate, manganese sulfide or manganese edta; The zinc salt comprises one or more of zinc sulfate, zinc chloride, zinc nitrate, zinc citrate, zinc malate, zinc oxalate, zinc sulfide or zinc edta; The copper salt comprises more than one of copper sulfate, copper chloride, copper nitrate, copper citrate, copper malate, copper oxalate, cuprous sulfide or copper ethylenediaminetetraacetate. Finally the technical effect similar to that of Embodiment 1 can also be obtained, and the pollution or accumulation of heavy metal cadmium in rice can be effectively controlled.

Specific Experiment 2: Experiment on Application Period of the Novel Organic Fertilizer for Controlling Pollution or Accumulation of Heavy Metal Cadmium in Rice The experiment of late rice planted in autumn was conducted using Zhongjia Zao 17 and Fupin 36 in the above-mentioned paddy fields in Fuyang, Hangzhou, in 2016. A plot experiment was adopted, with the plot area of 20 square meters. The experiment was made with a blank control and topdressing treatments at different stages using organic fertilizer of Embodiment 1. Topdressing treatments at different stages included topdressing at seedling stage, topdressing at booting stage, topdressing at early filling stage, topdressing at seedling stage+booting stage, topdressing at seedling stage+booting stage+filling stage. For each topdressing treatment, 3 kg was applied to per plot, with a total of six treatments (including blank control). Meanwhile, after each fertilization, the field was kept flooded at 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 2

Effect of applying the novel organic fertilizer (Embodiment 1) at different stages on the control of cadmium accumulation in rice

| Treatment | Average (mg/kg) | |
| --- | --- | --- |
| | Zhongjiazao 17 | Fupin 36 |
| CK | 0.445 ± 0.027 | 0.495 ± 0.027 |
| Topdressing at seedling stage | 0.314 ± 0.019 | 0.326 ± 0.020 |
| Topdressing at booting stage | 0.208 ± 0.031 | 0.213 ± 0.028 |
| Topdressing at early filling stage | 0.367 ± 0.022 | 0.353 ± 0.035 |
| Topdressing at seedling stage + booting stage | 0.167 ± 0.018 | 0.169 ± 0.009 |
| Topdressing at seedling stage + booting stage + fillingstage | 0.193 ± 0.024 | 0.200 ± 0.035 |

Table 2 showed that the application of the novel organic fertilizer could significantly reduce the cadmium content in brown rice of the two varieties regardless of the growth period. However, topdressing in different periods has obvious differences in the effect on accumulation of cadmium in rice. Among them, top dressing at booting stage, top dressing at seedling stage+booting stage, and top dressing at seedling stage+booting stage+filling stage had the best effect. After top dressing at seedling stage+booting stage, the cadmium content in brown rice of the two varieties was lower than 0.2 mg/kg. The results also showed that topdressing at filling stage could reduce cadmium content in rice, but the effect was poor. A further comparison between topdressing at booting stage and topdressing at seedling stage+booting stage+filling stage showed that the effects of the two treatments were not significantly different. There were two possibilities: 1. Topdressing during filling stage was not the key period to control cadmium accumulation in rice; 2. The root system activity was significantly weakened during filling stage, and its main function is to absorb water and some mineral nutrients to meet the grain demand. It was more likely that the ratio of the organic fertilizer ingredients added according to Embodiment 1 was not suitable for application at filling stage. It could also be seen that the booting stage was the most critical period for controlling cadmium accumulation in rice. In general, the results of this experiment showed that seedling stage (10 days after seedling transplantation)+topdressing at booting stage was the most effective for controlling cadmium accumulation in rice.

Specific Experiment 3: Study on the Control of Cadmium Accumulation in Rice by Adding Organic Fertilizers with Different Proportions of Trace Elements The experiment of cadmium control for early rice was conducted in Fuyang, Hangzhou in 2018. The commercially available organic fertilizer of Embodiment 1 was still used as a benchmark. Organic fertilizer added with different proportions of trace elements was trial-produced. (1) 30 kg of ferrous sulfate calculated as iron, 90 kg of manganese sulfate calculated as manganese, 5 kg of zinc sulfate calculated as zinc, and 0.5 kg of copper sulfate calculated as copper were added into each 1,000 kg of commercially available organic fertilizer, which were recorded as organic fertilizer A (i.e., the organic fertilizer of Embodiment 1). (2) 30 kg of ferrous sulfate calculated as iron, 30 kg of manganese sulfate calculated as manganese, 5 kg of zinc sulfate calculated as zinc and 0.5 kg of copper sulfate calculated as copper were added into each 1,000 kg of commercially available organic fertilizer, which were recorded as organic fertilizer B. (3) 30 kg of ferrous sulfate calculated as iron, 30 kg of manganese sulfate calculated as manganese, 10 kg of zinc sulfate calculated as zinc and 0.5 kg of copper sulfate calculated as copper were added into each 1,000 kg of commercially available organic fertilizer, which were recorded as organic fertilizer C. (4) 30 kg of ferrous sulfate calculated as iron, 30 kg of manganese sulfate calculated as manganese, 30 kg of zinc sulfate calculated as zinc and 1.0 kg of copper sulfate calculated as copper were added into each 1,000 kg of commercially available organic fertilizer, which were recorded as organic fertilizer D. (5) 30 kg of ferrous sulfate calculated as iron, 10 kg of manganese sulfate calculated as manganese, 30 kg of zinc sulfate calculated as zinc and 1.0 kg of copper sulfate calculated as copper were added into each 1,000 kg of commercially available organic fertilizer, which were recorded as organic fertilizer E. (6) 30 kg of ferrous sulfate calculated as the basis of iron, 10 kg of manganese sulfate calculated as the basis of manganese, 10 kg of zinc sulfate calculated as the basis of zinc and 1.0 kg of copper sulfate calculated as the basis of copper were added into each 1,000 kg of commercially available organic fertilizer, which were recorded as organic fertilizer F. (7) 30 kg of ferrous sulfate calculated as iron, 180 kg of manganese sulfate calculated as manganese, 10 kg of zinc sulfate calculated as zinc and 1.0 kg of copper sulfate calculated as copper were added into each 1,000 kg of commercially available organic fertilizer, which were recorded as organic fertilizer H. There were a total of 7 organic fertilizers. With Zhongjiazao 17 and Fupin 36 as experimental materials, the treatments were made with a blank control and topdressing treatments (applying the same organic fertilizer) at seedling stage+booting stage+filling stage. During the treatment, 3 kg was applied to each plot. Meanwhile, after each fertilization, the field was kept flooded at 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 3

Effects of organic fertilizers with different proportions of trace fertilizers on cadmium accumulation in rice

| Treatment | | Average (mg/kg) | |
|---|---|---|---|
| | | Zhongjiazao 17 | Fupin 36 |
| | CK | 0.511 ± 0.063 | 0.609 ± 0.039 |
| Topdressing at seedling stage + booting stage + filling stage | Treatment with organic fertilizer A | 0.201 ± 0.024 | 0.210 ± 0.043 |
| | Treatment with organic fertilizer B | 0.225 ± 0.032 | 0.253 ± 0.013 |
| | Treatment with organic fertilizer C | 0.267 ± 0.009 | 0.293 ± 0.044 |
| | Treatment with organic fertilizer D | 0.145 ± 0.011 | 0.187 ± 0.016 |
| | Treatment with organic fertilizer E | 0.303 ± 0.025 | 0.384 ± 0.031 |
| | Treatment with organic fertilizer F | 0.265 ± 0.018 | 0.300 ± 0.005 |
| | Treatment with organic fertilizer G | 0.430 ± 0.033 | 0.425 ± 0.020 |

The results in Table 3 showed that compared with the control, the organic fertilizers prepared with the seven (from A to H) different proportions of trace fertilizer had significant effects on cadmium accumulation in rice, but there were significant differences among different fertilizers. As shown in the early rice experiment (specific experiment 1) in 2016, treatment A (organic fertilizer in experiment 1) still had a significant control effect on cadmium accumulation in rice of the two varieties. Relatively speaking, although treatment with organic fertilizer H also significantly reduced cadmium in rice, the effect was the worst among all fertilizers, which indicated that it was likely that a large amount of manganese content inhibited the absorption of other elements and improved the cadmium transport capacity of the root system. For treatment with organic fertilizer D, although the trace elements were not in accordance with the normal proportion of straw elements, they were basically proportioned in accordance with the proportion of elements in rice. In combination with the treatment with organic fertilizer B, it could be seen that the filling stage was also the key period to control cadmium accumulation in rice. In particular, the organic fertilizer should be proportioned in accordance with the proportion of elements in rice.

Embodiment 2: An Organic Fertilizer for Controlling Pollution or Accumulation of Heavy Metal Cadmium in Rice Based on 1,000 kg of straw (with a cadmium content less than 0.6 mg/kg) or wood chips (from wood processing plants) or astragalus smicus with a water content of 15%, 30 kg of ferrous sulfate calculated as iron, 90 kg of manganese sulfate calculated as manganese, 5 kg of zinc sulfate calculated as zinc, 0.5 kg of copper sulfate calculated as copper and 10 kg of citric acid are added.

The organic fertilizer is prepared according to the following steps:

1) uniformly mixing the organic material, iron salt, manganese salt, zinc salt, copper salt, organic acid and salt thereof, and organic chelating agent with the said mass and stirring into powder;
2) making the uniform powder obtained in step 1) into granules with a diameter of 0.3-1.2 cm by using an extruder or a granulator, the granules being the novel organic fertilizer for controlling the pollution or accumulation of heavy metal cadmium in rice.

Specific Experiment 4: Effects of Different Organic Matters as Trace Fertilizer Carriers and Addition of Organic Acid on the Accumulation of Cadmium in Rice The experiment was conducted in Fuyang, Hangzhou in 2018. Using early rice of two varieties (Zhongjia Zao 32 and Zhongzao 22) with similar growth periods as experimental materials, the effects of straw as organic fertilizer carrier and addition of organic acids on cadmium accumulation in rice were studied. Six kinds of organic fertilizers were produced in the experiment: (1) Based on 1000 kg of commercially available straw with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, 0.5 kg of copper sulfate calculated as copper and 10 kg of citric acid (Embodiment 2) were added and the mixture was recorded as organic fertilizer A. (2) Based on 1000 kg of commercially available straw with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, and 0.5 kg of copper sulfate calculated as copper were added and the mixture was recorded as organic fertilizer B. (3) Based on 1000 kg of commercially available wood chip with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, 0.5 kg of copper sulfate calculated as copper and 10 kg of citric acid (Embodiment 2) were added and the mixture was recorded as organic fertilizer C. (24) Based on 1000 kg of commercially available wood chip with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, and 0.5 kg of copper sulfate calculated as copper were added and the mixture was recorded as organic fertilizer D. (3) Based on 1000 kg of commercially available astragalus smicus with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, 0.5 kg of copper sulfate calculated as copper and 10 kg of citric acid (Embodiment 2) were added and the mixture was recorded as organic fertilizer E. (24) Based on 1000 kg of commercially available astragalus smicus with a water content of 15% (cadmium content less than 0.6 mg/kg), 30 kg of ferrous sulfate calculated as iron, 90 kg of manganese sulfate calculated as manganese, 5 kg of zinc sulfate calculated as zinc, and 0.5 kg of copper sulfate calculated as copper were added and the mixture was recorded as organic fertilizer F. A blank control (CK) and treatments with organic fertilizers A, B, C, D, E and F were set, and the plot area was 20 square meters, with three replicates and random treatment. The application period of organic fertilizer was topdressing at seedling stage+booting stage+filling stage, with 3 kg topdressing per time in each stage. Meanwhile, after each fertilization, the field was kept flooded at 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 4

Effects of different organic matters as trace fertilizer carriers and addition of organic acid on cadmium accumulation in rice

| | Treatment | mean (mg/kg) | Relative CK brown rice Cadmium reduction |
|---|---|---|---|
| Zhongjiazao 32 | CK | 0.302 ± 0.027 | |
| | Treatment with organic fertilizer B | 0.177 ± 0.030 | 41.39% |
| | Treatment with organic fertilizer A(Embodiment 2) | 0.122 ± 0.019 | 59.60% |
| | Treatment with organic fertilizer D | 0.200 ± 0.020 | 33.77% |
| | Treatment with organic fertilizer C(Embodiment 2) | 0.142 ± 0.013 | 52.98% |
| | Treatment with organic fertilizer F | 0.149 ± 0.014 | 50.66% |
| | Treatment with organic fertilizer E(Embodiment 2) | 0.140 ± 0.008 | 53.64% |
| Zhongzao 22 | CK | 0.281 ± 0.016 | |
| | Treatment with organic fertilizer B | 0.168 ± 0.040 | 47.69% |
| | Treatment with organic fertilizer A(Embodiment 2) | 0.119 ± 0.046 | 65.12% |
| | Treatment with organic fertilizer D | 0.172 ± 0.026 | 46.26% |
| | Treatment with organic fertilizer C(Embodiment 2) | 0.133 ± 0.011 | 60.14% |
| | Treatment with organic fertilizer F | 0.121 ± 0.007 | 64.41% |
| | Treatment with organic fertilizer E(Embodiment 2) | 0.123 ± 0.013 | 63.70% |

The results in Table 4 showed that rice straw, wood chips and astragalus smicus as trace fertilizer carriers were very effective for controlling cadmium accumulation in rice (for organic fertilizers B, D and F). At the same time, it could be seen that when rice straw and wood chips were used as trace fertilizer carriers, with the addition of organic acids (citric acid), organic fertilizers A and C could further enhance the control effect on cadmium accumulation in rice, which is mainly because the fiberized straw and wood chips at the mature stage have relatively slow decay process, and it is likely to be relatively difficult to maintain the availability of trace elements to some extent, and the addition of organic acids can significantly improve the availability of trace elements; When the astragalus smicus is harvested and dried in the sun, the fibrosis is relatively low, and the astragalus smicus is extremely easy to rot and produce a large amount of organic acids, which can effectively improve the availability of trace elements. And the effect of further addition of organic acid was not obvious. It is also revealed that organic acid trace fertilizers such as ferrous citrate, copper citrate, manganese citrate, zinc citrate or chelated iron, manganese, copper and zinc can be used for production of the cadmium-controlling organic fertilizer. However, the cost of such organic acid or chelated trace elements is relatively high.

Embodiment 3: An Organic Fertilizer for Controlling Pollution or Accumulation of Heavy Metal Cadmium in Rice Based on 1000 kg of commercially available bagasse with a water content of 15%, 30 kg of iron sulfate calculated as iron, 90 kg of manganese sulfate calculated as manganese, 5 kg of zinc sulfate calculated as zinc, 0.5 kg of copper sulfate calculated as copper, 10 kg of citric acid or 5 kg of chelating agent EDTA disodium salt were added.

The organic fertilizer is prepared according to the following steps:
1) uniformly mix the organic material, iron salt, manganese salt, zinc salt, copper salt, organic acid and salt thereof, and organic chelating agent with the said mass and stirring into powder;
2) making the uniform powder obtained in step 1) into granules with a diameter of 0.3-1.2 cm by using an extruder or a granulator, the granules being the novel organic fertilizer for controlling the pollution or accumulation of heavy metal cadmium in rice.

Specific Experiment 5: Effect of Organic Fertilizer with Bagasse as Trace Element Carrier on Cadmium Control in Rice The experiment was carried out in cadmium-contaminated farmland in Kunming, Yunnan Province in 2018. The soil has a cadmium content of 0.6 mg/kg, a pH of about 5.0 and a sandy soil texture. Yunnan is rich in sugarcane, and a large amount of bagasse is left and needing to be disposed. In this experiment, two organic fertilizers were made: (1) Based on 1000 kg of commercially available bagasse with a water content of 15%, 30 kg of ferrous sulfate calculated as iron, 90 kg of manganese sulfate calculated as manganese, 5 kg of zinc sulfate calculated as zinc, 0.5 kg of copper sulfate calculated as copper and 10 kg of citric acid were added, and the mixture was recorded as organic fertilizer A (Embodiment 3). (2) Based on 1000 kg of commercially available bagasse with a water content of 15%, 30 kg of ferrous sulfate calculated as iron, 90 kg of manganese sulfate calculated as manganese, 5 kg of zinc sulfate calculated as zinc, 0.5 kg of copper sulfate calculated as copper and 5 kg of disodium EDTA instead of citric acid were added, and the mixture was recorded as organic fertilizer B (Embodiment 3). (3) Based on 1000 kg of commercially available bagasse with a water content of 15%, 30 kg of ferrous sulfate calculated as iron, 90 kg of manganese sulfate calculated as manganese, 5 kg of zinc sulfate calculated as zinc, 0.5 kg of copper sulfate calculated as copper were added, and the mixture was recorded as organic fertilizer C. Two japonica rice varieties, Dianhua No. 2 and Chujing No. 4, which were the old main local varieties, were used as materials for single cropping rice planting. A plot experiment was made with a plot area of 20 square meters. The treatments were set with a blank control, organic fertilizer A treatment, and organic fertilizer B treatment, which were repeated three times and randomly treated. The application period of organic fertilizer was topdressing at seedling stage+booting stage+filling stage, with 3 kg topdressing per time in each stage. Meanwhile, after each fertilization, the field was kept flooded at 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 5

Effect of organic fertilizer with bagasse as trace element carrier on rice cadmium control in acidic cadmium-contaminated farmland

| | Treatment | mean (mg/kg) | Relative CK brown rice Cadmium reduction |
|---|---|---|---|
| Dianhua No. 2 | CK | 0.561 ± 0.054 | |
| | Organic fertilizer C (Embodiment 3) | 0.199 ± 0.026 | 64.53% |
| | Organic fertilizer B (Embodiment 3) | 0.157 ± 0.012 | 72.01% |
| | Organic fertilizer A (Embodiment 3) | 0.184 ± 0.031 | 67.20% |
| Chujing 4 | CK | 0.622 ± 0.045 | |
| | Organic fertilizer C (Embodiment 3) | 0.215 ± 0.023 | 69.77% |
| | Organic fertilizer B (Embodiment 3) | 0.134 ± 0.025 | 78.46% |
| | Organic fertilizer A (Embodiment 3) | 0.188 ± 0.017 | 72.55% |

The results in Table 5 showed that even the cadmium-controlling organic fertilizer made with bagasse as organic matter was very effective for the control of rice cadmium pollution in acidic cadmium-contaminated soil. Not only it had a great control effect on the cadmium content of the two varieties, but also the cadmium content of the two varieties of rice with the organic acid and organic fertilizer in the field was reduced to below the 0.2 mg/kg, which is the value specified in China National Standard. More interestingly, after the addition of chelating agent EDTA disodium salt, the cadmium content in brown rice of the two varieties was not only much lower than CK, but also significantly lower than that in organic fertilizer with or without citric acid. Chelating agent EDTA is very likely to form chelating state with iron, manganese, copper and zinc, and can maintain available for a long time. At the same time, EDTA can also combine with cadmium to form a stable chelated state. Due to the strong water permeability of sandy soil, the total cadmium content in the soil is reduced (the data are not shown in the table). On this basis, it was very likely that the two causes, namely, the reduction of available iron, manganese, copper, and zinc at a relatively high level for a long time and the reduction of total cadmium, led to the significant reduction of cadmium content in brown rice of the two varieties. However, chelating agents such as EDTA also have certain problems. First, they are difficult to degrade in soil; Second, their price cost is much higher than that of organic acids such as citric acid.

Specific Experiment 6: Exploration on Extreme Value Proportion of Trace Elements in a Novel Organic Fertilizer for Controlling the Pollution or Accumulation of Heavy Metal Cadmium in Rice This experiment was carried out in cadmium-contaminated farmland in Fuyang District of Hangzhou in 2019. The soil pH of paddy field was about 5.0, and the soil cadmium content was about 0.40 mg/kg. A plot experiment was made with a plot area of 20 square meters and repeated three times. Taking Embodiment 1 and blank as double controls, extreme values of different trace element ratios were designed to explore the effect of the extreme ratio of trace element in organic fertilizer on the control of cadmium pollution in rice. The varieties were Nipponbare (japonica) and 9311 (indica), which were used for single cropping rice planting. The fertilizing period was topdressing at seedling stage+booting stage+filling stage, 3 kg of the fertilizer was applied to each plot at each stage, and the field was kept flooded for 1 week after fertilization. Other management was completely the same as the local farming measures.

Based on 1000 kg of commercially available organic fertilizer with a water content of 15% (using cow dung as the main raw material, nitrogen, phosphorus and potassium are each about 5%, and the cadmium content is less than 0.8 mg/kg), the following organic fertilizers with extreme proportions of trace elements were designed: (1) 30 kg of ferrous sulfate calculated as iron, 90 kg of manganese sulfate calculated as manganese, 5 kg of zinc sulfate calculated as zinc, and 0.5 kg of copper sulfate calculated as copper were added (Embodiment 1, as a control); (2) 0 kg of ferrous sulfate calculated as iron, 90 kg of manganese sulfate calculated as manganese, 5 kg of zinc sulfate calculated as zinc, and 0.5 kg of copper sulfate calculated as copper were added (recorded as Fe0); (3) 300 kg of ferrous sulfate calculated as iron, 90 kg of manganese sulfate calculated as manganese, 5 kg of zinc sulfate calculated as zinc, and 0.5 kg of copper sulfate calculated as copper were added (recorded as Fe300); (4) 30 kg of iron sulfate, 0 kg of manganese sulfate, 5 kg of zinc sulfate and 0.5 kg of copper sulfate were added (recorded as Mn0); (5) 30 kg of ferrous sulfate calculated as iron, 450 kg of manganese sulfate calculated as manganese, 5 kg of zinc sulfate calculated as zinc, and 0.5 kg of copper sulfate calculated as copper were added (recorded as Mn450); (6) 30 kg of ferrous sulfate calculated as iron, 90 kg of manganese sulfate calculated as manganese, 0 kg of zinc sulfate calculated as zinc, and 0.5 kg of copper sulfate calculated as copper were added (recorded as Zn0); (7) added with 30 kg of ferrous sulfate calculated as iron, 90 kg of manganese sulfate calculated as manganese, 150 kg of zinc sulfate calculated as zinc, and 0.5 kg of copper sulfate calculated as copper (recorded as Zn150); (8) added with 30 kg of ferrous sulfate calculated as iron, 90 kg of manganese sulfate calculated as manganese, 5 kg of zinc sulfate calculated as zinc, and 0 kg of copper sulfate calculated as copper (recorded as Cu0); (9) added with 30 kg of ferrous sulfate calculated as iron, 90 kg of manganese sulfate calculated as manganese, 5 kg of zinc sulfate calculated as zinc, and 50 kg of copper sulfate calculated as copper (recorded as Cu50).

TABLE 6

Effects of organic fertilizers with different extreme ratios of trace elements on cadmium accumulation in brown rice

| | | Average (mg/kg) | |
|---|---|---|---|
| Treatment | | Nipponbare | 9311 |
| Blank control (CK) | | 0.781 ± 0.063 | 0.833 ± 0.039 |
| | Organic fertilizer of Embodiment 1 | 0.241 ± 0.027 | 0.280 ± 0.038 |
| Topdressing at seedling stage + booting stage + filling stage | Fe0 | 0.400 ± 0.019 | 0.536 ± 0.067 |
| | Fe300 | 0.767 ± 0.091 | 0.893 ± 0.111 |
| | Mn0 | 0.645 ± 0.037 | 0.687 ± 0.077 |
| | Mn450 | 0.703 ± 0.062 | 0.784 ± 0.101 |
| | Zn0 | 0.512 ± 0.055 | 0.300 ± 0.014 |
| | Zn150 | 0.830 ± 0.049 | 0.825 ± 0.050 |
| | Cu0 | 0.313 ± 0.021 | 0.333 ± 0.042 |
| | Cu50 | 0.654 ± 0.046 | 0.749 ± 0.087 |

The results showed that after treatment with organic fertilizer of Embodiment 1, the cadmium content in brown rice of Nipponbare and 9311 still exceeded the standard, but was far lower than that of the blank control. After treatment with Fe0, the cadmium content of brown rice of the two varieties is also much lower than that of the blank control, but also much higher than that of Embodiment 1; At the same time, after treatment with Fe300, the cadmium content of Nipponbare brown rice was lower than that of the blank control, but it was not significant, while that of 9311 brown rice was higher than that of the blank control, which might be due to the increase of iron film on the root surface caused by ferrous iron, which promoted cadmium absorption. After treatment with Mn0 and Mn450, the cadmium content in brown rice of two varieties was lower than that of the blank control, but the reduction was small and the cadmium content is much higher than that of the control in Embodiment 1. Therefore, manganese plays a very important role in cadmium control. Cadmium content in brown rice treated with Zn0 was decreased to a significant level compared with that of the blank control, but it was still much higher than that of the control in Embodiment 1, while there was almost no difference between the two varieties of brown rice treated with Zn150 and the blank control. However, from the perspective of iron content in brown rice (the data are not shown in the table), a large amount of zinc treatment resulted in a significant decrease in iron content, which might be due to the enhanced expression of protein genes with cadmium absorption and transport functions in the iron absorption of the root system. The treatments with Cu0 and Cu50 both led to significant decreases in cadmium content of the two varieties, but the cadmium contents were both significantly higher than that in Embodiment 1. However, the decrease of cadmium content in two rice varieties treated with Cu50 was much lower than that of Cu0. It was speculated that the reason was that although the copper content in soil was relatively low, the demand for copper by rice plants, including rice, was very low, and the copper in soil could still meet the demand for rice growth; However, after a large amount of copper was added, copper ions strongly inhibited the absorption of iron by rice the root system, which also resulted in a significant reduction in the content of iron, manganese and zinc in plants. The reason is probably consistent with the large-scale application of zinc.

Specific Experiment 7: Repeatability Verification Experiment of Cadmium-Controlling Organic Fertilizer on the Control of Cadmium Accumulation in Rice Two early rice varieties (Zhongjiazao 17 and Fupin 36) were planted in a cadmium-contaminated field in Fuyang, Hangzhou, in 2019. A plot contrast experiment was conducted with the plot area of 20 square meters, which was randomly arranged and repeated three times. The fertilizer treatments were set with a blank control and organic fertilizer treatment according to Embodiment 1: Organic fertilizer was applied by topdressing at seedling stage (10 day after transplantation), booting stage and early filling stage, with 3 kg per plot and per growth period; Meanwhile, after each fertilization, the field is kept flooded for 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 7

Regional contrast experiment of early rice in Fuyang (soil Cd ≈ 0.6 mg/kg, soil pH ≈ 6.0) (long-term rainfall)

| Treatment | | mean (mg/kg) | Compared with CK Reduction of cadmium content in rice |
|---|---|---|---|
| Zhongjiazao 17 | CK | 0.065 ± 0.015 | 69.59% |
| | Treatment | 0.020 ± 0.004 | |
| Fupin 36 | CK | 0.022 ± 0.006 | 85.06% |
| | Treatment | 0.003 ± 0.002 | |

Table 7 shows that cadmium contents of two rice varieties were greatly reduced by 69.59% and 85.06% after treatment with organic fertilizer (according to Embodiment 1). However, due to the long-term low temperature and long-term rainfall during the growth period of early rice in the first half of 2019, the cadmium content of rice in CK was also much lower than 0.2 mg/kg. However, it is undeniable that organic fertilizer is very effective in controlling the accumulation of cadmium in rice.

Specific Experiment 8: Study on Application of Cadmium-Controlling Organic Fertilizer to Single Cropping Rice in Cadmium-Contaminated Field Two single cropping rice varieties, Chunyou 84 (japonica) and Zhongzheyou 8 (indica), were planted in the cadmium-contaminated field in Fuyang, Hangzhou, in 2019. The soil cadmium content is about 1.0 mg/kg, and the soil pH is about 6.5. A regional contrast experiment was adopted with the region area of 160 square meters, and the fertilizer treatment was made with a blank control and a treatment with organic fertilizer of Embodiment 1: The organic fertilizer was applied by topdressing at seedling stage (10 days after transplantation), booting stage and early filling stage, with 24 kg for each growth period in each plot; Meanwhile, after each fertilization, the field is kept flooded for 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 8

Regional contrast experiment of single cropping rice in Fuyang (soil Cd ≈ 0.6mg/kg, soil pH ≈ 6.0)

| Treatment | | mean (mg/kg) | Reduction |
|---|---|---|---|
| Chunyou 84 | CK | 0.628 ± 0.037 | 62.42% |
| | Treatment | 0.236 ± 0.097 | |
| Zhongzheyou no.8 | CK | 0.657 ± 0.140 | 69.47% |
| | Treatment | 0.201 ± 0.077 | |

It can be seen from Table 8 that the cadmium content of single cropping rice of the two varieties reached more than three times of the china national standard of 0.2 mg/kg. After treatment with organic fertilizer (Embodiment 1), the cadmium content of rice decreased significantly, by 62.42% and 69.47%, but the cadmium content of rice of the two varieties still slightly exceeded the standard.

Specific Experiment 9: Application of Cadmium-Controlling Organic Fertilizer in Acidic Cadmium-Contaminated Soil The experiment was carried out in cadmium-contaminated acidic soil in Changsha, Hunan Province, in 2019. Soil Cd≈0.40 mg/kg, pH≈5.0. Due to the temporary arrangement of the experiment, two early rice varieties Erjiunan 1 and Fupin 36 with significant differences in cadmium accumulation were planted for late rice planted in autumn and regional contrast experiment. The total area of the experiment is 2 mu, and the region area is 0.5 mu per variety. Cadmium-controlling organic fertilizer (Embodiment 1) was applied only once at the booting stage. After fertilization, the field was kept flooded for 1-2 cm for one week. The rice was harvested by five-point sampling per plot method in the harvest period, dried in the sun according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 9

Application of cadmium control organic fertilizer in acidic cadmium-contaminated soil

| Treatment | | mean (mg/kg) | Reduction |
|---|---|---|---|
| Erjiunan 1 | CK | 0.260 ± 0.098 | 46.60% |
| | Treatment | 0.139 ± 0.034 | |
| Fupin 36 | CK | 0.483 ± 0.105 | 58.62% |
| | Treatment | 0.200 ± 0.007 | |

Table 9 shows that the cadmium content of rice in the two controls exceeded the standard; However, after only one application of cadmium-controlling organic fertilizer at the booting stage, the cadmium content in rice was significantly reduced, and none of them exceeded the standard. This is probably related to the imbalance of trace elements in acidic soil, especially the elements such as manganese and zinc are very likely to leak and lose under acidic conditions. After the application of the organic fertilizer, not only a large number of trace elements were added, but also the high availability was maintained for a long time.

Specific Experiment 10: Experiment and Demonstration of Cadmium-Controlling Organic Fertilizer in Field The experiment was carried out in cadmium-contaminated area of Tangxi Town, Jinhua City, Zhejiang Province in 2019, with a demonstration area of 100 mu. Soil Cd≈0.45 mg/kg, soil pH≈5.0. The specific operations were as follows: Four fields with an area of about 2 mu were selected, and each field was equally divided into two parts, with a waterproof ridge in the middle. One part is used for the control (CK), and the other is applied with organic fertilizer (Embodiment 1) (equivalent to 4 replicates). The fertilizer was applied at 100 kg per mu at each of the seedling stage, booting stage and filling stage. After fertilization, the field was kept flooded for 1-2 cm for one week. Five-point sampling every repetition was adopted during harvest, and they were merged into one sample. The harvested rice is dried according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 10

Sampling inspection data of late rice in field experiment and demonstration in Tangxi, Jinhua City, Zhejiang Province

| Treatment | | mean (mg/kg) | Reduction |
|---|---|---|---|
| Yongyou 1540 | CK | 0.339 ± 0.021 | 76.99% |
| | Treatment | 0.078 ± 0.059 | |

Specific Experiment 11: In Jinhua City, Zhejiang Province

The experiment was carried out in cadmium-contaminated area of Luobu Town, Jinhua City, Zhejiang Province in 2019, with a demonstration area of 100 mu. Soil Cd≈0.35 mg/kg, soil pH≈5.0. The specific operations were as follows: Four fields with an area of about 2 mu were selected, and each field was equally divided into two parts, with a waterproof ridge in the middle. One part is used for the control (CK), and the other is applied with organic fertilizer (Embodiment 1) (equivalent to 4 replicates). The fertilizer was applied at 100 kg per mu at each of the seedling stage, booting stage and filling stage. After fertilization, the field was kept flooded for 1-2 cm for one week. Five-point sampling every repetition was adopted during harvest, and they were merged into one sample. The harvested rice is dried according to the conventional method, ground into rice, and then pulverized (ground) into brown rice flour. Concentrated hydrochloric acid and concentrated nitric acid were prepared into aqua regia for pretreatment. The content of cadmium in the nitrification solution was determined by ICP-OES. The experimental results were as follows:

TABLE 11

Sampling inspection data of late rice in field experiment and demonstration in Luobu, Jinhua City, Zhejiang Province

| Treatment | | mean (mg/kg) | Reduction |
|---|---|---|---|
| Yongyou 15 | CK | 0.356 ± 0.008 | 78.09% |
| | Treatment | 0.078 ± 0.009 | |

What is claimed is:

1. A organic fertilizer for controlling pollution or accumulation of heavy metal cadmium in rice, comprising:
   an organic material with a water content of 15%;
   iron salt calculated as iron;
   manganese salt calculated as manganese;
   zinc salt calculated as zinc;
   copper salt calculated as copper;
   organic acid and salt thereof; and
   an organic chelating agent,
   wherein, based on 100 kg of the organic material with the water content of 15%,
   the iron salt calculated as iron is 0.05-5 kg; and
   a mass ratio of the iron salt calculated as iron, the manganese salt calculated as manganese, the zinc salt calculated as zinc, the copper salt calculated as copper, the organic acid and salt thereof, and the organic chelating agent is 1:0.2-8:0.08-2:0.001-0.5:0.33-1:0-1.

2. The organic fertilizer for controlling pollution or accumulation of heavy metal cadmium in rice according to claim 1, wherein the mass ratio of the iron salt calculated as iron, the manganese salt calculated as manganese, the zinc salt calculated as zinc and the copper salt calculated as copper is 1:0.3-3:0.15-1:0.01-0.3.

3. The organic fertilizer for controlling pollution or accumulation of heavy metal cadmium in rice according to claim 1, wherein the organic material comprises one or more of a rapeseed cake, a soybean cake, a soybean meal, a rice straw, a barley and wheat straw, a sugar cane scrap, a sugar bagasse, a rape straw, a corn straw, a sorghum straw, a sawdust, a weed straw, an astragalus smicus straw, an alfalfa straw, a waste paper or water hyacinth;

or the organic material is a commercially available organic fertilizer with livestock manure as a main raw material.

4. The organic fertilizer for controlling pollution or accumulation of heavy metal cadmium in rice according to claim 1, wherein the iron salt comprises one or more of ferrous sulfate, ferric sulfate, ferric chloride, ferrous chloride, ferric nitrate, ferric citrate, ferrous citrate, ferrous malate, ferrous malate, ferric oxalate, ferrous sulfide, ferric ethylenediaminetetraacetate or ferrous ethylenediaminetetraacetate.

5. The organic fertilizer for controlling pollution or accumulation of heavy metal cadmium in rice according to claim 1, wherein the manganese salt comprises one or more of manganese sulfate, manganese chloride, manganese nitrate, manganese citrate, manganese malate, manganese oxalate, manganese sulfide or manganese ethylenediaminetetraacetate.

6. The organic fertilizer for controlling pollution or accumulation of heavy metal cadmium in rice according to claim 1, wherein the zinc salt comprises one or more of zinc sulfate, zinc chloride, zinc nitrate, zinc citrate, zinc malate, zinc oxalate, zinc sulfide or zinc ethylenediaminetetraacetate.

7. The organic fertilizer for controlling pollution or accumulation of heavy metal cadmium in rice according to claim 1, wherein the copper salt comprises one or more of copper sulfate, copper chloride, copper nitrate, copper citrate, copper malate, copper oxalate, cuprous sulfide or copper ethylenediaminetetraacetate.

8. The organic fertilizer for controlling pollution or accumulation of heavy metal cadmium in rice according to claim 1, wherein the organic acid and salt thereof comprise one or more of citric acid, sodium citrate, potassium citrate, calcium citrate, magnesium citrate, malic acid, sodium malate, potassium malate, calcium malate, magnesium malate, oxalic acid, sodium oxalate, potassium oxalate, calcium oxalate or magnesium oxalate.

9. The organic fertilizer for controlling pollution or accumulation of heavy metal cadmium in rice according to claim 1, wherein the organic chelating agent comprises one or more of ethylenediaminetetraacetic acid, ethylenediaminetetraacetic acid sodium, ethylenediaminetetraacetic acid potassium, ethylenediaminetetraacetic acid calcium or ethylenediaminetetraacetic acid magnesium.

10. A preparation method for the organic fertilizer for controlling pollution or accumulation of heavy metal cadmium in rice according to claim 1, comprising the following steps:
1) Uniformly mixing the organic material, the iron salt, the manganese salt, the zinc salt, the copper salt, the organic acid and salt thereof, and the organic chelating agent with the said mass and stirring into powder; and
2) making the uniform powder obtained in step 1) into granules with a diameter of 0.3-1.2 cm by using an extruder or a granulator, the granules being the organic fertilizer for controlling the pollution or accumulation of heavy metal cadmium in rice.

11. An application method for the organic fertilizer for controlling pollution or accumulation of heavy metal cadmium in rice according to claim 1, comprising:
a. for early rice, carrying out topdressing when ploughing a field or within 10 days after transplanting seedlings, and broadcasting 0-500 kg of the organic fertilizer to each mu (0.16 acre) of the field as a base fertilizer; broadcasting 0-500 kg of the organic fertilizer to each mu of the field as an additional fertilizer at a booting stage; and broadcasting 0-500 kg of the organic fertilizer to each mu of the field at a filling stage;
b. for late rice, carrying out topdressing when ploughing the field or within 10 days after transplanting seedlings, and broadcasting 0-500 kg of the organic fertilizer to each mu of the field as the base fertilizer; broadcasting 0-500 kg of the organic fertilizer to each mu of the field as the additional fertilizer at the booting stage; and broadcasting 0-500 kg of the organic fertilizer to each mu of the field at the filling stage; and
c. for single cropping rice, carrying out topdressing when ploughing the field or within 10 days after transplanting seedlings, and broadcasting 0-500 kg of the organic fertilizer to each mu of the field as the base fertilizer; broadcasting 0-500 kg of the organic fertilizer to each mu of the field as the additional fertilizer at the booting stage; broadcasting 0-500 kg of the organic fertilizer to each mu of the field at the early filling stage.

12. An application method for the organic fertilizer for controlling pollution or accumulation of heavy metal cadmium in rice according to claim 1, comprising:
a. for early rice, carrying out topdressing when ploughing a field or within 10 days after transplanting seedlings, and broadcasting 5-50 kg of the organic fertilizer to each mu (0.16 acre) of the field as a base fertilizer; broadcasting 5-100 kg of the organic fertilizer to each mu of the field as an additional fertilizer at a booting stage; and broadcasting 5-50 kg of the organic fertilizer to each mu of the field at a filling stage;
b. for late rice, carrying out topdressing when ploughing the field or within 10 days after transplanting seedlings, and broadcasting 10-100 kg of the organic fertilizer to each mu of the field as the base fertilizer; broadcasting 10-100 kg of the organic fertilizer to each mu of the field as the additional fertilizer at the booting stage; and broadcasting 10-100 kg of the organic fertilizer to each mu of the field at the filling stage; and
c. for single cropping rice, carrying out topdressing when ploughing the field or within 10 days after transplanting seedlings, and broadcasting 25-100 kg of the organic fertilizer to each mu of the field as the base fertilizer; broadcasting 25-100 kg of the organic fertilizer to each mu of the field as the additional fertilizer at the booting stage; broadcasting 25-100 kg of the organic fertilizer to each mu of the field at the early filling stage.

* * * * *